United States Patent Office 3,354,227
Patented Nov. 21, 1967

3,354,227
PROCESS FOR THE PREPARATION OF MONO-
PHENYL ETHERS OF GLYCOLS
Ewald Katzschmann, Dortmund-Kruckel, Germany, assignor to Chemische Werke Witten G.m.b.H., Witten (Ruhr), Germany
No Drawing. Filed Nov. 14, 1963, Ser. No. 323,559
Claims priority, application Germany, Dec. 7, 1962,
C 28,603
7 Claims. (Cl. 260—613)

It is known that metal alkali phenolates may be reacted as such, or in aqueous solution, with alkyl halides or alkyl sulfates to produce phenol glycol ethers. The phenol glycol ethers, particularly the ethylene and propylene glycol ethers of mono- and polyhydric phenols and their substituted derivatives, have great significance in the processing or finishing of textiles in connection with the preparation of tanning agents and preserving aids, as well as in the field of pest control. These known phenol glycol ethers are distinctly defined ethers of polyglycols. These substances are prepared in the water-free and, less frequently, in an aqueous medium by the accumulation or addition of ethylene oxide or propylene oxide to phenols with the use of alkaline catalysts. The operation of the phenol glycol monoether stage at a high-percent yield is difficult so that these processes are not employed for the production of a purely defined phenol glycol monoether for technical use. The particular difficulty in the preparation of phenol glycol monoethers involves the detection of conditions which render possible the etherification of only one hydroxyl group of polyhydric alcohols, although the reaction is always effected over the monoether stage. Thus, it is known to react equimolecular amounts of phenol and ethylene oxide to give the corresponding phenol glycol monoether in a closed tube over a period of 10 hours at 150° C.. Also known in the prior art is the reaction of cresols with ethylene oxide in the presence of sodium ethylate in an alcoholic solution.

It has now been found that phenol glycol monoethers may be prepared in a simple manner and in simple apparatus and with a high yield and purity by reacting mono- and/or polynuclear mono- and/or polyhydric phenolic components with alkylene oxides in the aqueous phase while stirring at temperatures of between 20 and 130° C., at pressures of from 0 to 10 atmospheres, and in the presence of small amounts of water-soluble neutral alkali metal salts and/or alkaline earth metal salts.

Mono- and polynuclear mono- and polyhydric phenolic components to be used in accordance with the present invention are, for example, phenols, polyphenols, naphthols, and their nuclear-substituted derivatives.

The expression "alkylene oxides" used in accordance with the present invention is intended to include ethylene oxide, propylene oxide and butylene oxide.

Employed as water-soluble neutral alkali metal salts and/or alkaline earth metal salts are preferably are potassium, sodium and calcium compounds with halogen hydracids, sulfuric acid and nitric acid. Sodium and/or potassium chloride are used with particular advantage.

Small amounts of the water-soluble neutral alkali metal salts and/or alkaline earth metal salts are sufficient to initiate the reaction in accordance with the present invention. It is expedient, however, to employ quantities of from 0.5 to 20% by weight, but particularly amounts between 2 and 10%, calculated with respect to the phenolic component employed.

Comparative experiments have shown that phenol glycol monoethers are not formed without the addition of the water-soluble neutral alkali metal salts and/or alkaline earth metal salts to be employed according to the present invention.

The reaction vessels to be used may be, for example, simple cylindrical storage vessels, kettles or low-pressure autoclaves, which may be suitably provided with a filling socket or nipple, gas inlet and gas outlet tube, and a stirring or shaking mechanism. The reaction vessels may consist of enamel, ceramic material, high-grade steel, glass, or similar materials. Reactions during which the components employed yield a uniform solution or mixture may be achieved by simply allowing them to stand in storage vessels without moving elements.

The reaction time depends upon the temperature and is determined by the type of phenolic component used.

The course of the reaction may be controlled easily, in many instances, by determining one or several characterizing numbers. If the reaction product forms two layers, it is advisable to determine the characterizing numbers of the oily phase, or to bring about such thorough and intimate mixing that the uniformity of the sample is preserved. The temperature and time conditions most favorable for actual operation may be determined quite easily.

The proportion of the water constituent may vary within wide limits in the reaction as proposed by the present invention. It is suitable however not to work below a quantitative ratio of 1:1 (by weight). The state of aggregation of the phenolic component is also a determining factor. For example, in case of a solid or high-melting phenolic component, such as pentachlorophenol, the water constituent must be greater than with the use of, for example, m-cresol, creosol, or similar phenols, which are liquid at working temperature. There are no upper limits for the amount of water constituent, but it is advantageous not to use more than the tenfold amount of water, referred to the amount of phenolic component used.

Further treatment of the reaction products is carried out in a conventional manner and creates no difficulties. If the reaction products are crystallizing ethers, they may be centrifuged, filtered, or decanted. If liquid ethers are involved, they may be mechanically separated in settling vessels into an aqueous and an oily phase. In special cases, the extraction may be made with a solvent, if desired in combination with the phase separation. The aqueous phases from the different methods of treatment are suitably used for a renewed reaction.

The process as proposed by the present invention may also be used in a continuous manner. This may be achieved particularly advantageously, for example, by preparing a uniform starting mixture with an excess of alkylene oxide, which is slowly further conveyed through a system of tubes or through a container. The excess amount of alkylene oxide is drawn off by vacuum into a second container, so that a phase separation into an oily ether layer and an aqueous layer is brought about. The ether may thus be separated in the second container, or in a special settling vessel. This method of operation is susceptible to variations and will depend primarily on the kind and type of phenolic component to be reacted and on the properties of the ether.

The phenol glycol monoethers prepared in accordance with the present invention are suitable as preserving and textile aids and represent valuable components for esterification and polycondensation. Additionally, they may be utilized, in many instances, as softeners (plasticizers) for plastics.

Accordingly, it is a primary object of the present invention to provide a new and improved process for the production of phenol glycol monoethers.

It is a further object of the present invention to provide such a process which is quite simple and economical.

Further objects of the present invention will become apparent from the detailed description hereinbelow wherein The process proposed by the present invention is further explained on the basis of several examples which serve to illustrate the invention without, however, limiting the same.

Example I

|  | G. |
|---|---|
| Pentachlorophenol, in purest form | 66.5 |
| Water | 300 |
| Potassium chloride, chemically pure | 10 |
| Propylene oxide | 25 | were combined at room temperature while stirring. The stirring vessel was brought to an inside temperature of 60° C. within 3 hours in a water bath while constantly stirring and with a reflux condenser being inserted thereinto. This temperature was maintained for another 5 hours. The reaction mixture was slowly converted from the solid-aqueous to the oily-aqueous condition. Instead of mechanically separating the oily layer, the reaction product was extracted with ether. Obtained were 71 g. ether extract, which is 87.7% of the theoretical yield. The chlorine content amounted to 54.2% (calculated as 54.5%), and the hydroxyl number was 170 (calculated as 173). The initially highly viscous pentachlorophenyl propylene glycol ether crystallized while standing. By recrystallization from ligroin, the ether was obtained with the following characterizing numbers—chlorine content: 54.5%, calculated as 54.5%; hydroxyl number: 172, calculated as 173; saponification number: 173, calculated as 173; melting point: 80.6° C.

The purification may be effected with the same successful outcome by distillation. The ether distills at 150° C. and 0.4 mm. Hg as a water-clear, highly viscous liquid which uniformly crystallizes after prolonged standing.

Example II

|  | G. |
|---|---|
| Pentachlorophenol, technical | 133 |
| Water | 300 |
| Sodium chloride | 10 |
| Propylene oxide | 50 | were combined in a cylindrical vessel equipped with reflux condenser at room temperature and while stirring. Subsequently, heating was effected to 50° C. within one hour, and to 70° C. within another 2 hours. The solid pentachlorophenol converted into the liquid ether after 1 hour. The cold reaction product which consisted of 2 layers was extracted with ether. 146 g. ether extract were obtained. During the distillation, 138 g. pentachlorophenyl propylene glycol ether, 85.2% of the theoretical yield, having the following characterizing numbers—chlorine content: 54.5%, calculated at 54.5%; hydroxyl number: 170, calculated as 173; saponification number: 173, calculated as 173; were obtained as the main fraction at from 152 to 154° C./0.5 mm. Hg.

The water-clear, initially highly viscous distillate became slowly converted into the crystalline condition.

Example III

|  | G. |
|---|---|
| Phenol | 94 |
| Water | 250 |
| Potassium chloride | 10 |
| Propylene oxide | 80 | were combined in a cylindrical stirring vessel at room temperature. The contents of the vessel were heated to 60° C. within 1 hour while continuously stirring and with the reflux condenser being in the inserted position, and kept at that temperature for another 9 hours. Subsquently, the unreacted propylene oxide was distilled off, ultimately under application of a slight vacuum. 15 g. propylene oxide could be recovered after the separation of the water over an intensely low temperature cooling device. The oily layer was mechanically separated and distilled. Aside from a slight preliminary run consisting partly of water, 143 g., 94.1% of the theoretical yield, of phenyl propylene glycol monoether were obtained as the main fraction at between 67 to 71° C. at 0.5 mm. Hg as a water-clear liquid with a flowery fragrance. The hydroxyl number thereof was 368.

When employing the same method of operation as outlined above, but with a reaction time of a total of 6½ hours, the yield was 84% of the theoretical.

Example IV

|  | G. |
|---|---|
| o-Cresol (3/4 mole) | 81 |
| Water | 300 |
| Potassium chloride | 6 |
| Propylene oxide | 55 | were treated and further processed as described in Example III. Aside from an unknown oily preliminary run of 36 g. with an elevated hydroxyl number, 66 g., 53% of the theoretical yield, of o-cresyl propylene glycol monoether were obtained as the main fraction at between 80 and 84° C. at 1 mm. Hg. The product was water-clear and had a pleasant aroma. The hydroxyl number was 339 (calculated as 338).

Example V

|  | G. |
|---|---|
| m-Cresol | 108 |
| Water | 250 |
| Potassium chloride | 10 |
| Propylene oxide | 80 | were treated as described in Example III. 14 g. propylene oxide were recovered by distillation. 164 g. could be mechanically separated as crude ether. Aside from a low preliminary run, 133 g. m-cresyl propylene glycol monoether, 79.2% of the theoretical yield, were obtained as the main fraction by distillation at between 82 and 84° C. and 0.9 mm. Hg. The hydroxyl number was 337 (calculated as 338).

Example VI

|  | G. |
|---|---|
| p-Cresol | 108 |
| Water | 250 |
| Sodium chloride | 10 |
| Propylene oxide | 80 | were combined in a cylindrical vessel with reflux condenser and stirrer, and the temperature was increased from 14 to 70° C. within one hour and kept thereat for another 8 hours. 18 g. propylene oxide could be recovered. The cold reaction product was extracted with ether, instead of being mechanically separated into an oily and an aqueous layer. The slightly yellow ether extract (159 g.) was distilled. Aside from a low preliminary run, 148 g., 89.1% of the theoretical yield, of p-cresyl propylene glycol monoether were obtained as the main fraction at between 89 to 93° C. at 1.3 mm. Hg. The product was water-clear, had a pleasant fragrance and a hydroxyl number of 338 (calculated as 338).

In an experiment conducted in the same manner, the ethereal solution was filtered over carbon and fuller's earth. 156 g. of a water-clear liquid were obtained as extract, having a pleasant aroma, and a hydroxyl number of 341.

Example VII

|  | G. |
|---|---|
| p-Chloro-m-cresol—(chlorine content found 24.7%, chlorine content calculated 24.9%) | 48 |
| Water | 200 |
| Sodium chloride | 5 | were heated in a cylindrical vessel with reflux condenser to 60° C. and stirred well. 28 g. propylene oxide were added within 15 minutes through a separating funnel immersed in the liquid and with the aid of a pressure ball. Stirring was effected for a total of 8 hours. The reaction product was deposited as a viscous, yellow-brownish layer which was absorbed in ether and purified by carbon filtration of the ethereal solution. The viscous colorless ether extract weighed 59 g., 88.3% of the theoretical yield, and had the following characterizing numbers—hydroxyl number: 282, calculated as 279; chlorine content: 18.1%, calculated as 17.7%.

The ether may be distilled quite effectively and boils at from 102 to 105° C. and 0.5 mm. Hg. The distillate showed the characterizing numbers that had been calculated.

Example VIII

|  | G. |
|---|---|
| Hydroquinone | 55 |
| Water | 250 |
| Potassium chloride | 5 |
| Propylene oxide | 100 | were mixed at room temperature in a cylindrical stirring vessel equipped with reflux condenser. A uniform colorless solution was formed. Heating was then effected to 40° C. within one hour. The solution thereby assumed a deep reddish brown color. Crystal formation set in after about 6 hours and became increasingly marked up to about 9 hours total reaction time. The experiment was interrupted after 9½ hours. After cooling to 18° C., a thick crystal pulp formed which was suctioned off and washed with water. 107 g. dry product were obtained. The characterizing numbers indicated that it was hydroquinone dipropylene glycol ether—hydroxyl number: 493 (calculated as 496); melting point: 120.5° C.

The yield amounted to 94.7% of the theoretical. The ether may be effectively recrystallized from water.

Example IX

Working was effected in accordance with Example II, but instead of sodium chloride, 10 g. sodium sulfate, water-free, were employed. The total time of the reaction was 9 hours. The yield corresponded precisely to that of Example II.

Example X

|  | G. |
|---|---|
| 3,4-dimethylphenol, technical | 61 |
| Water | 250 |
| Potassium chloride | 6 |
| Propylene oxide | 44 | were combined in a cylindrical vessel with stirrer and reflux condenser at room temperature and heated within 1 hour to 50° C. Stirring was effected for a total of 18 hours. The cold reaction product was extracted with ether, and the ethereal solution filtered over carbon and fuller's earth. 75 g., 83.3% of the theoretical yield, of dimethylphenyl propylene glycol monoether were obtained. The ether had a light orange color and a viscous consistency. The hydroxyl number was 307, calculated as 312.

Example XI

|  | G. |
|---|---|
| Pentachlorophenol, technical | 133 |
| Ice water | 300 |
| Potassium chloride | 10 |
| Ethylene oxide | 33 | were combined in a cylindrical vessel with stirrer and reflux condenser at from 5 to 10° C. Heating was continued to 60° C. within 4 hours and stirring continued at this temperature for another 20 hours. The reaction mixture had been converted into an oily-aqueous mixture. The oily layer solidified when cooled to a solid cake which was mechanically separated. Its weight was 152 g., 98% of the theoretical. The faintly brown-colored crude product was recrystallized from ligroin with intermediate purification by carbon filtration. The purely white crystallizate had the following characterizing numbers—hydroxyl number: 182 (calculated as 181); saponification number: 181 (calculated as 181); chlorine content: 57.1% (calculated as 57.2%); melting point: 93° C.

Example XII

|  | G. |
|---|---|
| Phenol | 94 |
| Ice water | 250 |
| Sodium chloride | 5 |
| Ethylene oxide | 50 | were heated to 90° C. within 30 minutes in a V4A (stainless steel) shaker autoclave, kept at that temperature for another 30 minutes and left to cool to 60° C. while constantly shaking. The pressure increased up to a maximum of 5 atmospheres during the reaction. When the autoclave was opened, a slight vacuum was still present. The reaction product consisted of 2 layers which were separated in the separating funnel. 140 g. were separated as oily layer. Another 8 g. could be isolated by extraction with ether of the aqueous layer. The crude ether was distilled. Aside from some water and a low preliminary run, 127 g., 92% of the theoretical yield, of phenyl ethylene glycol monoether were obtained as the main fraction at 94° C. and 2 mm. Hg. This fraction had a hydroxyl number of 409 (calculated as 407) and was a water-clear liquid.

Example XIII

The same ingredients and method of operation were used as in Example XII except with a change in temperature from 90° C. to 130° C. Both quantitatively and qualitatively, precisely the same result was obtained as in Example XII.

Example XIV

|  | G. |
|---|---|
| p-t-Butylphenol | 75 |
| Ice water | 250 |
| Potassium chloride | 8 |
| Ethylene oxide | 25 | were combined in a cylindrical glass vessel with stirrer and reflux condenser at from 5 to 10° C. and kept at room temperature for 28 hours while continuously stirring. The temperature was 25° C. after 20 minutes and 21° C. after 28 hours. The reaction product consisted of an aqueous bottom layer and an oily upper layer, which was separated mechanically. The oily layer, 95 g., were absorbed in ether, filtered over carbon and fuller's earth and rendered ether-free. The water-clear p-t-butylphenyl ethylene glycol monoether crystallized slowly with further standing. The yield of pure product amounted to 87.7% of the theoretical.

Example XV

|  | G. |
|---|---|
| Phenol | 94 |
| Water | 250 |
| Calcium chloride, water-free | 10 |
| Propylene oxide | 80 | where combined in a cylindrical glass vessel with stirrer and reflux condenser. The temperature was increased to 60° C. within 60 minutes. After a total of 8 hours, 15 g. propylene oxide could be recovered over a connected cooling device having an intense cooling effect. The reaction product was mechanically separated into two layers and the aqueous layer extracted with ether. 168 g. crude ether were employed for the distillation. Aside from water and a slight preliminary run of 1 g., 144 g. phenylpropylene glycol monoether were obtained as the main fraction at between 68 and 70° C. and 0.6 mm. Hg. This fraction had a hydroxyl number of 368 (calculated as 369) and was a water-clear liquid. The yield was found to be 94.8% of the theoretical.

Example XVI

|  | G. |
|---|---|
| 2,2 - bis - (p - hydroxyphenyl)propane ("bisphenol A") | 114 |
| Water | 400 |
| Calcium chloride, water-free | 10 |
| Ethylene oxide | 85 | were combined in a cylindrical glass vessel with stirrer and reflux condenser. Stirring was effected for 1 hour at between 18 and 21° C. and the temperature was subsequently increased to 50° C. for another 2 hours and then kept at that temperature for 30 minutes. 29 g. unused ethylene oxide could be recovered over a descending cooler with cooling trap. The temperature was increased therefor to 75° C. During the distillation of the excess ethylene oxide, the heretofore oily ether was crystallized out in well formed crystals. After cooling to room temperature, the partly loose, partly crusty crystallizate was comminuted with a rapid stirrer, suctioned off sharply, washed with water and dried. The yield amounted to 156 g., 98.8% of the theoretical. The following characterizing numbers were found—hydroxyl number: 356, calculated as 355; melting point: 112–112.5° C.

After recrystallization from benzene, the melting point did not change.

Example XVII

| | G. |
|---|---|
| Tetrachlorohydroquinone, technical (about a 95% solution) | 124 |
| Water | 350 |
| Calcium chloride, water-free | 10 |
| Ethylene oxide | 80 | were combined at room temperature in a cylindrical glass vessel equipped with stirrer and reflux condenser. Stirring was carried out for 1 hour at 18° C. The temperature was increased to 32° C. within another 3 hours, and upon a gradual increase thereof, the temperature reached 52° C. within another 4 hours (a total of 8 hours). The reaction mixture remained in suspension during the entire reaction time. A change of color resulted from yellow-brown to green-yellow to dark green. No further changes could be observed during the reaction. After cooling, sharp suction was carried out and the crystalline filter residue was dried. The yield of light-olive-colored crystals amounted to 160 g. with a melting range of from 140 to 145° C. The crude product was recrystallized from acetone and filtration effected over active carbon and fuller's earth. The yield of purest product (fine white needles) amounted to 132 g., 82.7% of the theoretical, calculated with respect to a 95% starting material. The following characterizing numbers were found—hydroxyl number, 334/335; chlorine content, 42.1%; melting point, 154.4° C. Calculated: hydroxyl number, 334; chlorine content, 42.15%.

The yield may even be improved by return of the mother liquor to recrystallize further batches.

Example XVIII

| | G. |
|---|---|
| Tetrachlorohydroquinone (melting point 232–235° C., Cl=57.4%) | 124 |
| Water | 350 |
| Calcium chloride, water-free | 10 | were combined at room temperature (18° C.) in a cylindrical vessel while stirring. Added dropwise to the vessel, provided with reflux condenser but otherwise closed, were 44 g. ethylene oxide (the theoretical amount for a complete ether formation), cooled to 0° C. in liquid form, and within 2 hours. The temperature increased thereby to 21° C. Subsequently, heating was continued to 60° C. in the course of another 6 hours, as permitted by the reflux of ethylene oxide. At that time, no further ethylene oxide could be detected. The reaction mixture remained in suspension during the entire time, and was further stirred until room temperature was reached. Subsequently, the solid body was filtered off, washed with water and dried, and recrystallized from benzene. A total of 136 g. tetrachlorohydroquinone diethylene glycol monoether could be obtained, having the following characterizing numbers—Found: hydroxyl number, 332; chlorine content, 42.1%; melting point, 152–153° C. Calculated: hydroxyl number, 334; chlorine content, 42.2%.

The yield amounts to 81% of the theoretical when using the theoretically required amount of ethylene oxide. The yield may even be increased when re-employing the residue from the mother liquor and the benzene-insoluble constituent of the recrystallization.

Example XIX

| | G. |
|---|---|
| Pentachlorophenol, purest (in pure form) | 133 |
| Water | 400 |
| Calcium chloride, water-free | 10 |
| 1,2-butylene oxide | 50 | were combined at room temperature in a cylindrical vessel made of glass and heated to 60° C. within 1 hour. The temperature was increased to 75° C. within another hour, whereby slight boiling started. The distillate was condensed by means of a reflux condenser. After a total of 5 hours, the suspension had been transformed into an oily-aqueous condition. After standing at room temperature, the oily layer was converted to a soft crystalline layer. The aqueous layer was poured off and the residue absorbed in acetone, filtered over active carbon and reacted with water while hot until turbidity set in. 65 g. white needles could be filtered off as crystallizate, having the following characterizing numbers—Found: hydroxyl number, 166; chlorine content, 52.3%; melting point, 87° C. Calculated: hydroxyl number, 165.5; chlorine content, 52.4%.

After distillation of the acetone from the filtrate and ether extraction of the aqueous residue, a further 93 g. of a syrupy substance were obtained, having the same chlorine content as the crystals, which slowly became transformed, while standing, into a pulp disseminated with crystals. The total yield amounted to 93.6% of the theoretical of pentachlorophenyl-butylene-glycol monoether.

Example XX

| | G. |
|---|---|
| Phenol | 94 |
| Water | 250 |
| Calcium chloride, water-free | 12 |
| 1,2-butylene oxide | 100 | were combined at room temperature in a cylindrical glass vessel equipped with stirrer and reflux condenser. (The butylene oxide may also be added dropwise while stirring at elevated temperature and over a longer period of time.) Heating was effected to 70° C. within 2 hours and these conditions were maintained for another 8 hours. The reaction product was then left to stand for separation in the separating funnel. 188 g. could be separated as oily layer. The ether extraction of the aqueous layer merely yielded another 3 g. extract. The thus isolated crude product was distilled. 25 g. unreacted butylene oxide, which had been used in an excess amount, could be recovered. After separation of a preliminary run of 11 g. which had a faint phenol odor, 152 g. phenylbutylene glycol monoether were obtained as the main fraction at between 84 and 85° C. and 0.5 mm. Hg, having the following OH number:

Hydroxyl number—found, 337; calculated 338.

The yield amounted to 91.5% of the theoretical of purest ether and 6.6% of a preliminary run rendered impure by traces of phenol.

While the invention has been described with reference to a number of examples thereof, it will be understood that changes may be made in carrying out the process without departing from the scope of the invention, and it is intended that all matter contained in the above description shall be interpreted as illustrative and not in a limiting sense.

I claim:
1. A process for the preparation of a monophenyl ether of a glycol which comprises reacting an alkylene oxide having from 2 to 4 carbon atoms with a phenol for a sufficient time at a temperature of from 20° to 130° C., and a pressure of from 0 to 10 atmospheres in the presence of a weight ratio of water to the other constituents in the reaction mixture of at least 1:1 and from 0.5 to 20% by weight, based on the amount of phenol reactant, of a salt selected from the group consisting of alkali metal salts of halogen hydracids, sulfuric acid and nitric acid, alkaline earth metal salts of halogen hydracids, sulfuric acid and nitric acid, and mixtures thereof.

2. The process of claim 1, wherein the alkali metal salt is sodium chloride.

3. The process of claim 1, wherein the alkali metal salt is potassium chloride.

4. The process of claim 1, wherein the alkali metal salt is sodium sulfate.

5. The process of claim 1, wherein the alkaline earth metal salt is calcium chloride.

6. The process of claim 1, wherein said phenol is selected from the group consisting of mononuclear mono- and polyhydric phenolic compounds and polynuclear mono- and polyhydric phenolic compounds.

7. The process of claim 1, wherein said reaction is carried out continuously.

References Cited

UNITED STATES PATENTS

| | | | |
|---|---|---|---|
| 1,976,677 | 10/1934 | Wittwer | 260—613 |
| 2,075,018 | 3/1937 | Bruson et al. | 260—613 |
| 2,428,235 | 9/1947 | Marple et al. | 260—613 |

OTHER REFERENCES

Boyd et al.: Jour. Chem. Soc. (London), vol. 105 (1914), pp. 2117–2124, 2132, 2133.

LEON ZITVER, *Primary Examiner.*

BERNARD HELFIN, *Examiner.*